(12) United States Patent
Tokura et al.

(10) Patent No.: US 7,068,421 B2
(45) Date of Patent: Jun. 27, 2006

(54) RAMAN AMPLIFIER AND OPTICAL RELAY TRANSMISSION SYSTEM

(75) Inventors: Toshiyuki Tokura, Tokyo (JP); Taichi Kogure, Tokyo (JP); Satoshi Kajiya, Tokyo (JP); Takashi Mizuochi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 270 days.

(21) Appl. No.: 10/654,438

(22) Filed: Sep. 4, 2003

(65) Prior Publication Data

US 2005/0099676 A1 May 12, 2005

(30) Foreign Application Priority Data

Dec. 6, 2002 (JP) ............................. 2002-355341

(51) Int. Cl.
H01S 3/00 (2006.01)
H04B 10/13 (2006.01)
H04B 10/08 (2006.01)

(52) U.S. Cl. .................... 359/334; 359/341.42; 398/31
(58) Field of Classification Search ........... 359/341.41, 359/341.42, 334; 398/31, 37
See application file for complete search history.

(56) References Cited

U.S. PATENT DOCUMENTS

| 5,943,162 | A * | 8/1999 | Kosaka et al. ......... 359/341.31 |
| 6,320,694 | B1 * | 11/2001 | Ohshima ............... 359/341.33 |
| 6,423,963 | B1 | 7/2002 | Wu |
| 6,798,567 | B1 * | 9/2004 | Feldman et al. ....... 359/341.42 |
| 6,819,479 | B1 * | 11/2004 | Islam et al. .................. 359/337 |
| 2002/0041431 | A1 | 4/2002 | Ohshima et al. |
| 2002/0126336 | A1 | 9/2002 | Sekiya et al. |
| 2002/0176154 | A1 * | 11/2002 | Sugaya et al. .............. 359/334 |
| 2002/0181075 | A1 * | 12/2002 | Fidric et al. ................. 359/334 |
| 2003/0117692 | A1 * | 6/2003 | Tanaka et al. .............. 359/334 |
| 2003/0137720 | A1 * | 7/2003 | Onaka et al. ............... 359/334 |
| 2004/0090663 | A1 * | 5/2004 | Kamada et al. ............. 359/334 |
| 2004/0190909 | A1 * | 9/2004 | Akasaka et al. ............ 398/173 |
| 2004/0246568 | A1 * | 12/2004 | Onaka et al. ................ 359/337 |
| 2005/0132785 | A1 * | 6/2005 | Onaka et al. .................. 73/117 |

FOREIGN PATENT DOCUMENTS

| JP | 2001-7768 A | 1/2001 |
| JP | 2001-109025 A | 4/2001 |

* cited by examiner

*Primary Examiner*—Jack Keith
*Assistant Examiner*—Ari M. Diacou
(74) *Attorney, Agent, or Firm*—Birch, Stewart, Kolasch & Birch, LLP

(57) ABSTRACT

An optical fiber propagates and amplifies a second signal light that is a wavelength-multiplexed signal of a first signal light of a plurality of wavelengths and a reference light that is out of a wavelength range of amplification. An excitation light source outputs an excitation light for amplifying the second signal light. A beam splitter splits a portion of the second signal light into the first signal light and the reference light. A signal light level detecting unit detects a level of the first signal light. A reference light level detecting unit detects a level of the reference light. A signal level setting unit calculates a target value for constantly maintaining a Raman gain, and controls the output level of the excitation light in such a way that the first signal level matches with the target value.

8 Claims, 5 Drawing Sheets

RAMAN AMPLIFIER AND OPTICAL RELAY TRANSMISSION SYSTEM

This nonprovisional application claims priority under 35 U.S.C. § 119(a) on Patent Application No(s). 2002-355341 tiled in JAPAN on Dec. 6, 2002, which is herein incorporated by reference.

BACKGROUND OF THE INVENTION

1) Field of the Invention

The present invention relates to a technology to improve gain and wavelength characteristics of a Raman amplifier for a reliable optical transmission system.

2) Description of the Related Art

One of the main problems in optical relay systems using an optical amplification of a wavelength-multiplexed signal light is the wavelength-dependent gain characteristics in an optical amplifier. To achieve quality transmission characteristics of a signal light, it is required to limit the level of each signal component of a different wavelength within a desired range to suppress signal degradation, such as a degradation of the S/N ratio due to a nonlinear effect of the transmission line and/or amplified spontaneous emission. This necessitates a proper design of the wavelength characteristics of the gain in the optical amplifier, such that the variation in the signal light level of each wavelength component can be suppressed. This kind of improvement in the wavelength characteristics of the gain is explored also for the Raman amplifier that is an effective means for extending a transmission distance. As a result of the study, for example, it is now possible to achieve a broadband Raman amplification over 80 nm in a 1.55 μm waveband transmission system using a silica fiber as a transmission line, by multiplexing plural excitation lights of different wavelengths.

Japanese Patent Laid-Open Publication No. 2001-7768 (Page 8 and 9, FIGS. 21 to 23) discloses a wavelength characteristic control method of the optical transmission power according to the Raman amplification. In this method, the average gain is changed while maintaining an even gain characteristic in the signal wavelength band by appropriately distributing power of the wavelength-multiplexed excitation light. By employing this method, it is possible to achieve a Raman amplifier that has a constant output level of each signal light regardless of the total power level of the input signal light.

However, one of the disadvantages of the Raman amplifier is that the wavelength characteristic of the gain also changes when the average gain of the Raman amplifier changes. FIG. 5 is a graph illustrating an example of the wavelength characteristic of a Raman gain, which is obtained by Raman-amplifying a signal light in the wavelength range of 1570 nm to 1608 nm with a backward excitation lights of 1470 nm and 1500 nm using a single mode fiber (SMF). The horizontal axis represents the wavelength of the signal light (nm) and the vertical axis represents the Raman gain (dB). The Raman gain is a ratio of the signal output level when the backward excitation light is input and the signal output level when the backward excitation light is not input. The Raman gain is also called an on-off gain. Two waveform characteristics of the Raman gain with different average Raman gains are shown In FIG. 5. The dotted-line curve represents a wavelength characteristic of the Raman gain when the average gain is 7.8 dB and the values of the Raman gain are shown on the left vertical axis. The solid curve represents a wavelength characteristic of the Raman gain when the average gain is 3.9 dB and the values of the Raman gain are shown on the right vertical axis.

As shown in FIG. 5, when the Raman gain is changed by changing the power of the excitation light, the wavelength dependency increases as the average gain increases. Because of this, even though the power of the excitation light of plural wavelengths is optimally distributed in the Raman amplifier, it is not possible to change only the average gain without changing the wavelength-dependent gain profile. This is an essential characteristic of the Raman amplification and poses a problem in practical use. Consequently, the power of the excitation light is changed first and then the average gain is changed, so that the output signal level from the Raman amplification always remains constant. However, in practical situations, due to a change in the average gain, the wavelength-dependent Raman gain also changes, thus resulting in a slight loss in the evenness of the signal light level of each wavelength component that constitutes an output signal light.

The use of a gain equalizer is disclosed as a means to suppress the wavelength dependency of the Raman gain. For instance, as a practical design, when the Raman amplifier constitutes an excitation light with fewer number of wavelengths (that is, fewer excitation light sources), the unevenness in the wavelength dependency of the Raman gain from the Raman amplification increases, as compared to the case when more number of excitation wavelengths is employed. This unevenness in the wavelength-dependent gain profile is corrected by using a gain equalizer. However, even when the gain equalizer is employed, if the average gain changes, the wavelength characteristic of the Raman gain does not match with the wavelength characteristic of the gain equalizer and an error in correction occurs. Further, even when the average gain is not explicitly changed, depending on the difference in conditions such as the gain efficiency of the optical fiber that carries out the Raman amplification or the loss occurring along a connection path of the optical fiber, etc., the average gain varies even if the excitation power is the same. Consequently, the wavelength characteristic also changes. This change in the wavelength characteristic does not match with the wavelength characteristic of the gain equalizer, thus causing the error in correction.

Hence, in order to maintain a constant Raman gain, the signal light level is measured both at the time of input and at the time of output from the amplifier, as disclosed in Japanese Patent Laid-Open Publication No. 2001-109025 (Page 5 and 6). Thus, the desired control over the Raman gain is achieved.

However, when the method disclosed in the second patent literature is applied to a Raman amplifier that uses an optical fiber as the amplifying medium, it is necessary to measure the signal level at two places separated by a considerable distance because the signal level is measured both at the time of input into the amplifier as well as at the time of output from the amplifier. Thus the structure of the amplifier becomes complex, because a means to transmit the control signals to distant places has to be incorporated.

SUMMARY OF THE INVENTION

It is an object of the present invention to solve at least the problems in the conventional technology.

The Raman amplifier according to one aspect of the present invention includes an optical fiber that propagates and amplifies a second signal light that is a wavelength-multiplexed signal of a first signal light and a reference light, wherein the first signal light includes a plurality of wavelengths and the reference light is out of a wavelength range of amplification, an excitation light source that outputs an excitation light for amplifying the second signal light, a first beam splitter that splits a portion of the second signal light into the first signal light and the reference light, a signal light level detecting unit that detects a level of the first signal light, a reference light level detecting unit that detects a level of the reference light, and a signal level setting unit that, based on the level of the reference light, calculates a target value to control signal light level for constantly maintaining a Raman gain, and controls the output level of the excitation light in such a way that the first signal level matches with the target value.

The optical relay transmission system according to another aspect of the present invention includes a signal light transmitting unit that outputs a signal light that has plural wavelengths, wavelength-multiplexes and transmits the signal light, a reference light output unit that outputs a reference light of a wavelength that is out of a wavelength band of the signal light, the Raman amplifier according to any one of claims 1 to 6 that amplifies, based on the reference light from the reference light output unit, the signal light from the signal light transmitting unit, and a signal receiving unit that receives the Raman-amplified signal light.

The other objects, features and advantages of the present invention are specifically set forth in or will become apparent from the following detailed descriptions of the invention when read in conjunction with the accompanying drawings.

DETAILED DESCRIPTION

Exemplary embodiments of a Raman amplifier and an optical relay transmission system according to the present invention are explained in detail with reference to the accompanying drawings.

Figure 1:
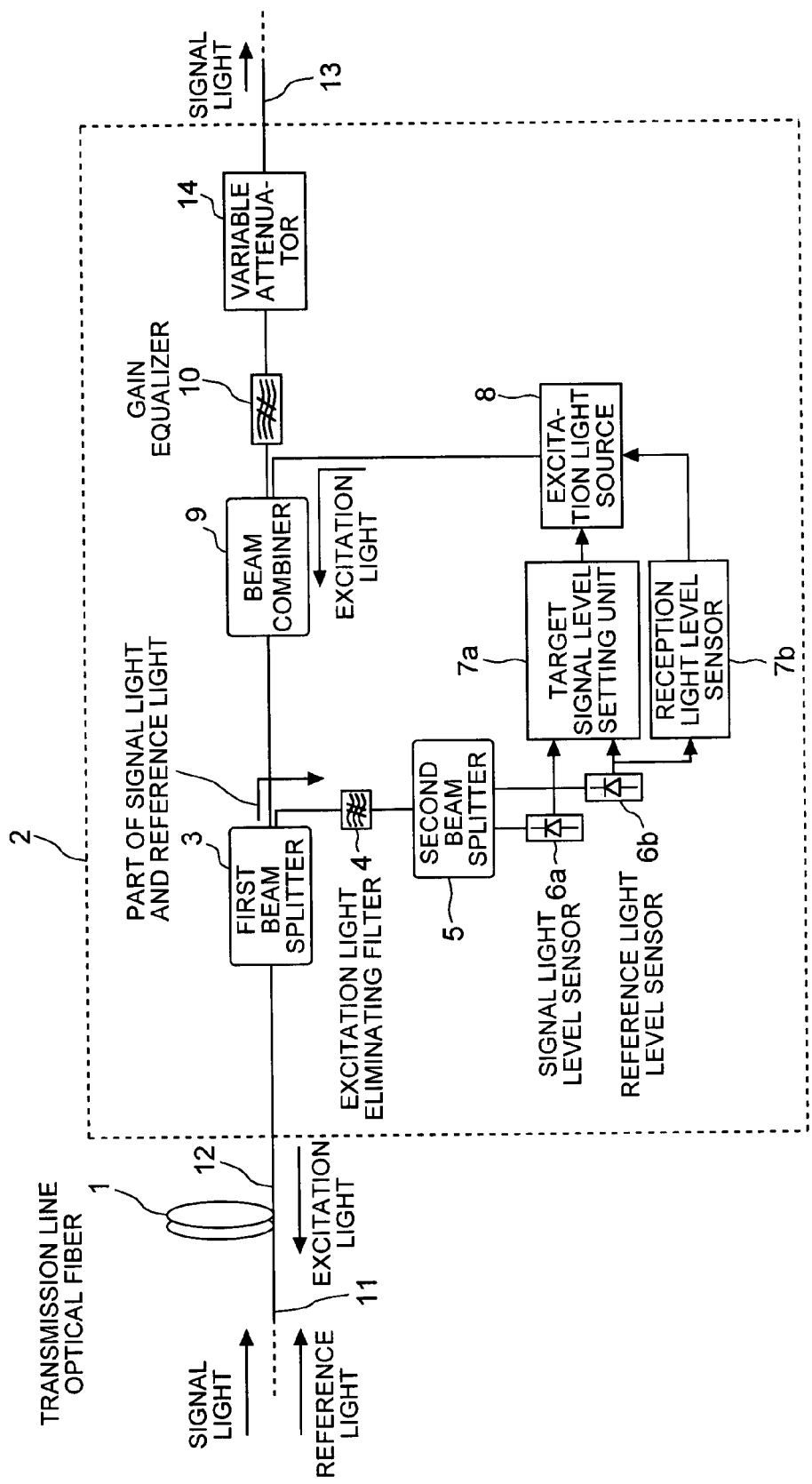
FIG. 1 is a block diagram of a Raman amplifier according to a first embodiment of the present invention.

FIG. 1 is a block diagram of a Raman amplifier according to a first embodiment of the present invention. The Raman amplifier 2 is a transmission line through which a signal light that is multiplexed with a signal light of 1580 nm wavelength and a reference light of 1510 nm wavelength is propagated. A transmission line optical fiber 1, which achieves the Raman amplification effect when an excitation light is input, is connected to the input end of the Raman amplifier 2. An optical fiber 13, which outputs the Raman-amplified signal light, is connected to the output end of the Raman amplifier 2.

The Raman amplifier 2 includes an excitation light source 8 that emits the excitation light of a wavelength required for the Raman amplification of the signal light of 1580 nm wavelength propagated through the transmission line optical fiber 1, and a beam combiner 9 that combines plural excitation lights from the excitation light source 8. The excitation light source 8 includes a laser oscillator such as a semiconductor laser diode that has an oscillation wavelength of 1450 nm band. When carrying out Raman amplification, an excitation light of a wavelength or plural excitation lights of different wavelengths are used such that the wavelength of the excitation light do not overlap with the wavelength of the wavelength-multiplexed signal light. When using plural excitation lights, the number of excitation lights is selected according to the necessary conditions in an optical relay transmission system employed in the Raman amplifier 2. Therefore, the excitation light source 8 includes either of a single excitation light source and plural excitation light sources that emit plural excitation lights of either of the identical wavelength and different wavelengths.

The Raman amplifier 2 further includes a first beam splitter 3 that separates a portion of the transmitted signal light from the transmission line optical fiber 1, an excitation light eliminating filter 4 that removes the excitation light from the signal light separated by the first beam splitter 3, a second beam splitter 5 that further separates the reference light of different wavelength from the separated signal light, a signal light level sensor 6a that measures the level of the signal light separated by the second beam splitter 5, a reference light level sensor 6b that measures the level of the reference light separated by the second beam splitter 5, a target signal level setting unit 7a that sets a target signal level according to the detection result of the signal light level and controls the excitation light source 8 based on the target signal level, and a reception light level sensor 7b that reduces the output of the excitation light source when the reference light level falls below a specific value.

The excitation light eliminating filter 4 is provided in order to reduce an error in measurement that occurs when a portion of the excitation light, which is reflected by the transmission line optical fiber 1, etc. and propagated in the same direction as that of the signal light, is input into the signal light level sensor 6a. The excitation light eliminating filter 4 may be omitted from the structure if the error in measurement is negligible.

The target signal level setting unit 7a adjusts the output of the excitation light source 8 such that, even if there is a change in the signal light level, the Raman gain is maintained at a constant level, that is, the unevenness in the signal light level of each wavelength component is suppressed in the Raman amplification. The target signal level setting unit 7a first stops practically all emission of the excitation light from the excitation light source 8. In this status, when no excitation light is present in the transmission line optical fiber 1, the target signal level setting unit 7 measures an output signal light level Ps_off, which is output from the transmission line optical fiber 1 and measured by the signal light level sensor 6a, and the reference light level sensor 6b measures an initial level of the reference light Pref_init. The target signal level setting unit 7a then sets the control target value Ps_on of the output signal light level with respect to a desired Raman gain G that is set beforehand, such that Ps_on is calculated as:

$$Ps\_on = Ps\_off \times G \times (Pref/Pref\_init) \tag{1}$$

where, Pref is a value that is measured recursively by the reference light level sensor 6b. In the expression (1), a linear unit mW or W is used as the unit for signal light levels Ps_on and Ps_off. It is assumed that the Raman gain G is a linear multiple and does not have a logarithmic unit dBm or dB. The target signal level setting unit 7a calculates the control target value Ps_on of the output signal light level according to the expression (1) using the output reference light level Pref measured by the reference light level sensor 6b. The target signal level setting unit 7a then adjusts the power of the excitation light output from the excitation light source 8 in such a way that the control target value Ps_on of the calculated output signal light level and an output signal light level Ps of the transmission line optical fiber 1 measured by the signal light level sensor 6a match with the control target value Ps_on of the output signal light level.

Two cases can be considered when adjusting the power of the excitation light output from the excitation light source 8 by using the expression (1): (A) when the output reference light level Pref is more or less constant; and (B) when the output reference light level Pref changes. The first case (A), namely, the case in which the output reference light level Pref is more or less constant, refers to a case when the gain efficiency of the transmission line optical fiber 1 does not vary or when the loss of the excitation light along the path to the transmission line optical fiber 1 does not vary and therefore the output reference light level Pref always remains constant. As a result, the control target value Ps_on of the output signal light level in the expression (1) also remains constant. Consequently, the target signal level setting unit 7a controls the output of the excitation light source 8 in such a way that the output signal light level Ps matches with the control target value Ps_on.

The second case (B), namely, the case in which the output reference light level Pref changes, refers to a case when the loss of the excitation light along the path to the transmission line optical fiber 1 varies or a case when the transmission line optical fiber 1 is replaced with another optical fiber and the output reference light level Pref changes. Therefore, the control target value Ps_on of the output signal light level in the expression (1) also changes. Consequently, the target signal level setting unit 7a controls the output of the excitation light source 8 in such a way that the output signal light level Ps matches with the control target value Ps_on. For instance, when the output reference light level Pref decreases, the output of the excitation light source 8 decreases accordingly. However, as the output of the excitation light is controlled in such a way that the Raman gain G remains constant, the signal light level of each wavelength component can be maintained at a constant level.

When the reference light level measured by the reference light level sensor 6b falls below a specific value, the reception light level sensor 7b assumes that the transmission line optical fiber 1 has been removed from the path and forcibly reduces the output of the excitation light source 8 to a specific level. This function helps prevent safety risk like leakage of high-level excitation light outside the optical fiber at a point 12, for instance, when the optical fiber connection is removed at the point.

Moreover, the Raman amplifier 2 may also include a gain equalizer 10 that corrects the wavelength characteristic of the Raman gain to a desired wavelength characteristic and a variable attenuator 14 that, by adjusting the average level of the signal light amplified by the Raman amplification, controls the entire wavelength-multiplexed signal light within a desired range while maintaining the wavelength characteristic of the gain. As the output of the signal light is controlled in such a way that the Raman gain maintains constant, the unevenness in the level of each wavelength of the signal light is suppressed preceding and following the Raman amplification. Therefore the gain characteristic of the signal light after the Raman amplification always remains constant and matches with the predetermined characteristic of the gain equalizer 10, thus enabling to suppress the error in correction caused by mismatching of the gain equalizer 10. Even when the variable attenuator 14 attenuates a signal light in which the unevenness in the levels of each wavelength component is suppressed, the unevenness in the levels of the signal light of each wavelength maintains constant. The gain equalizer 10 and the variable attenuator 14 can be employed according to the requirement.

In the above explanation, a light that falls outside the Raman amplification band, that is, a light that does not undergo the Raman amplification from the excitation light is used as a reference light. Therefore, when the gain efficiency of the transmission line optical fiber 1 remains constant or when the loss of the excitation light along the connection path of the transmission line optical fiber 1 remains constant, the reference light remains at a constant level preceding and following the Raman amplification, regardless of the power of the excitation light. The light used as the reference light is not confined only to the said wavelength band. For instance, it is possible to use a monitoring control light that is used to monitor and control an optical transmission system. This monitoring control light is a light that is multiplexed in a different waveband than that of the signal light and is used to transmit the information required for system monitoring or system control. For instance, an Optical Supervisory Channel (OSC) light of 1510 nm (or 1310 nm, 1480 nm) specified in the G. 692 recommended by the ITU-T may be used as the monitoring control light.

Figure 2:
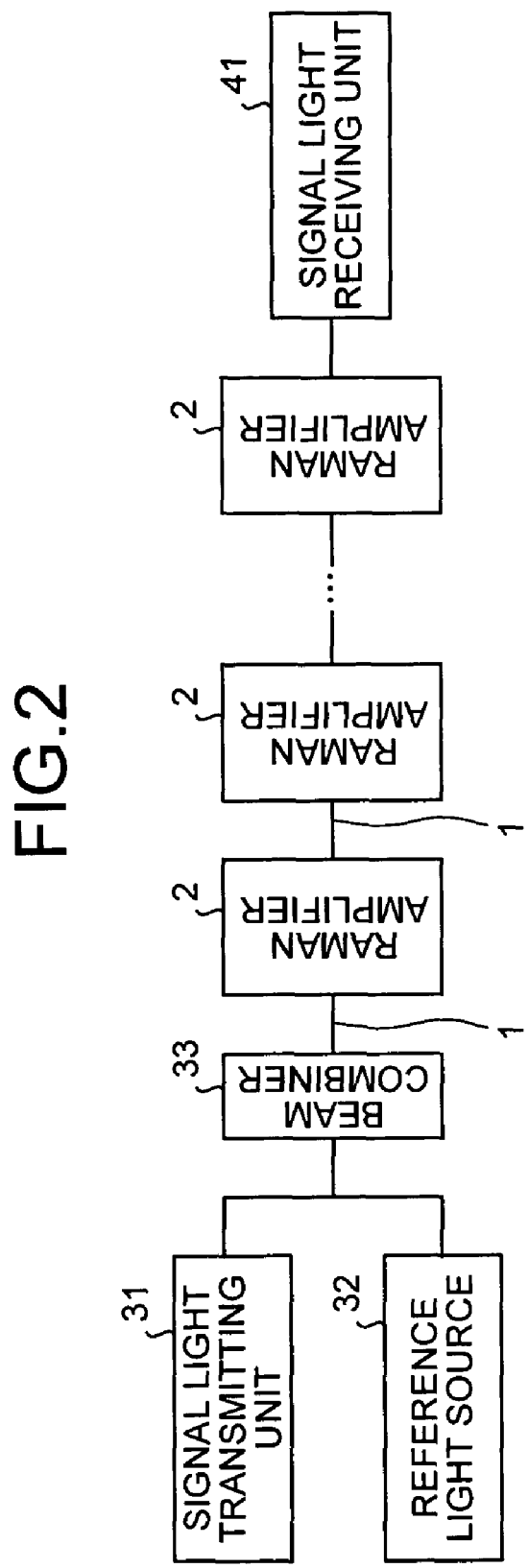
FIG. 2 is a block diagram of an optical relay transmission system according to the present invention.

FIG. 2 is a block diagram of an optical relay transmission system that includes a Raman amplifier. The optical relay transmission system includes a signal light transmitting unit 31, a reference light source 32 that outputs a reference light of such a wavelength band that does not undergo amplification and is transmitted at the same time with the signal light, a beam combiner 33 that combines the signal light and the reference light, a transmission line optical fiber 1 that transmits the combined signal light, a Raman amplifier 2 that amplifies the signal light propagated through the transmission line optical fiber 1, and a signal light receiving unit 41 that receives the signal light. The signal light transmitting unit 31 further includes a light source that outputs a signal light of plural wavelengths, a beam combiner that multiplexes the signal light of plural wavelengths, etc. The signal light receiving unit 41 further includes a beam splitter that separates the signal light of each wavelength component.

Prior to the Raman amplification and before the excitation light is output by the excitation light source, the Raman amplifier 2 separates a portion of the signal light input into the Raman amplifier 2 by using the first beam splitter 3 and then separates the signal light and the reference light by using the second beam splitter 5. The level of the signal light separated by the second beam splitter 5 is detected by the signal light level sensor 6a and the detected value is stored in the target signal level setting unit 7a as the output signal light level Ps_off prior to the Raman amplification. The level of the reference light separated by the second beam splitter 5 is detected by the reference light level sensor 6b and the detected value is stored in the target signal level setting unit 7a as the initial level Pref_init of the reference light.

The signal light undergoes Raman amplification by the optical relay transmission system after the retrieval of the output signal light level Ps_off and the initial level Pref_init of the reference light prior to Raman amplification. The beam combiner 9 combines the excitation light of plural wavelengths emitted from the excitation light source 8 and emits the excitation light in the direction opposite to that of the signal light. The excitation light then Raman-amplifies the signal light in the transmission line optical fiber 1.

When the signal light, which is Raman-amplified by the excitation light in the transmission line optical fiber 1, is input into the Raman amplifier 2 via the transmission line optical fiber 1, the first beam splitter 3 separates a portion of the signal light. The excitation light eliminating filter 4 then removes the wavelength component of the excitation light, which is emitted from the excitation light source 8 and included in the separated signal light. The signal light, from which the wavelength component of the excitation light is removed, enters the second beam splitter 5 and gets separated into a signal light of 1580 nm wavelength and a reference light of 1510 nm wavelength. The signal light level only at the point of output from the transmission line optical fiber 1 is detected from among the separated signal light in the range of 1580 nm band by the signal light level sensor 6a and the detected value is input as the output signal light level Ps into the target signal level setting unit 7a. On the other hand, the reference light level only at the point of output from the transmission line optical fiber 1 is detected from among the separated reference light by the reference light level sensor 6b and the detected value is input as the output signal light level Pref into the target signal level setting unit 7a and the reception light level sensor 7b.

The target signal level setting unit 7a calculates the control target value Ps_on of the output signal light level according to the expression (1) by using the initial level Pref_init of the reference light, the output signal light level Ps_off prior to Raman amplification, and the output reference light level Pref and then compares the control target value Ps_on of the output signal light level with the output signal light level Ps. After that, for instance, when the control target value Ps_on of the output signal light level is greater than the output signal light level Ps, the target signal level setting unit 7a controls the excitation light source 8 in such a way that the power of the excitation light source 8 is reduced to minimize the difference between the control target value Ps_on of the output signal light level and the output signal light level Ps. On the other hand, when the control target value Ps_on of the output signal light level is less than the output signal light level Ps, the target signal level setting unit 7a controls the excitation light source 8 in such a way that the output of the excitation light source 8 is increased to minimize the difference between the control target value Ps_on of the output signal light level and the output signal light level Ps. The excitation light is then emitted from the excitation light source 8 at the level being controlled by the target signal level setting unit 7a. The process of Raman amplification of the signal light, as described above, is then repeated.

The reception light level sensor 7b determines whether the reference light level Pref falls below a specific value, for instance, below −40 dBm and only when the reference light level Pref falls below a specific value, the reception light level sensor 7b forcibly reduces the output of the excitation light source 8 to a specific level, regardless of the control of the target signal level setting unit 7a. The excitation light is then emitted from the excitation light source 8 at the level being controlled by the reception light level sensor 7b. On the other hand, when the reference light level Pref rises above a specific value, the reception light level sensor 7b does not control the excitation light source 8 at all.

Each signal light that is output by a signal light source, which outputs a plurality of signal lights of the same wavelength or different wavelengths stored in the signal light transmitting unit 31, is multiplexed by a beam combiner and transmitted as one signal light. At the same time, the reference light is also transmitted from the reference light source 32. The signal light and the reference light are further combined into one signal light by the beam combiner 33 and transmitted to the Raman amplifier 2 via the transmission line optical fiber 1.

When passing through the transmission line optical fiber 1, the transmitted signal light is Raman-amplified by the excitation light, which is output from the excitation light source 8 of the Raman amplifier 2 and controlled according to the output level of the signal light and the output level of the reference light as described above. The amplified signal light is input into the Raman amplifier 2. A portion of the Raman-amplified signal light is then separated by the first beam splitter 3 and used as the signal light to control the excitation light source 8. The remaining signal light is propagated as it is through the optical fiber and is corrected to a desired wavelength characteristic by the gain equalizer 10. The average level of each signal light is then adjusted by the variable attenuator 14. The signal light, which is controlled in such a way that the entire wavelength-multiplexed signal light falls within the desired level range, is output via the optical fiber 13 while maintaining the wavelength characteristic of the gain.

If a Raman amplifier 2 is employed at the subsequent stages of the present Raman amplifier 2 as well, the same process is repeated. The signal light output from a Raman amplifier 2 employed at the last stage is input into the signal light receiving unit 41. In the signal light receiving unit 41, the multiplexed signal light is separated into each wavelength component by the beam splitter and each signal light is then output corresponding to a specific device, for instance, by converting the signal light into electrical signals.

Figure 5:
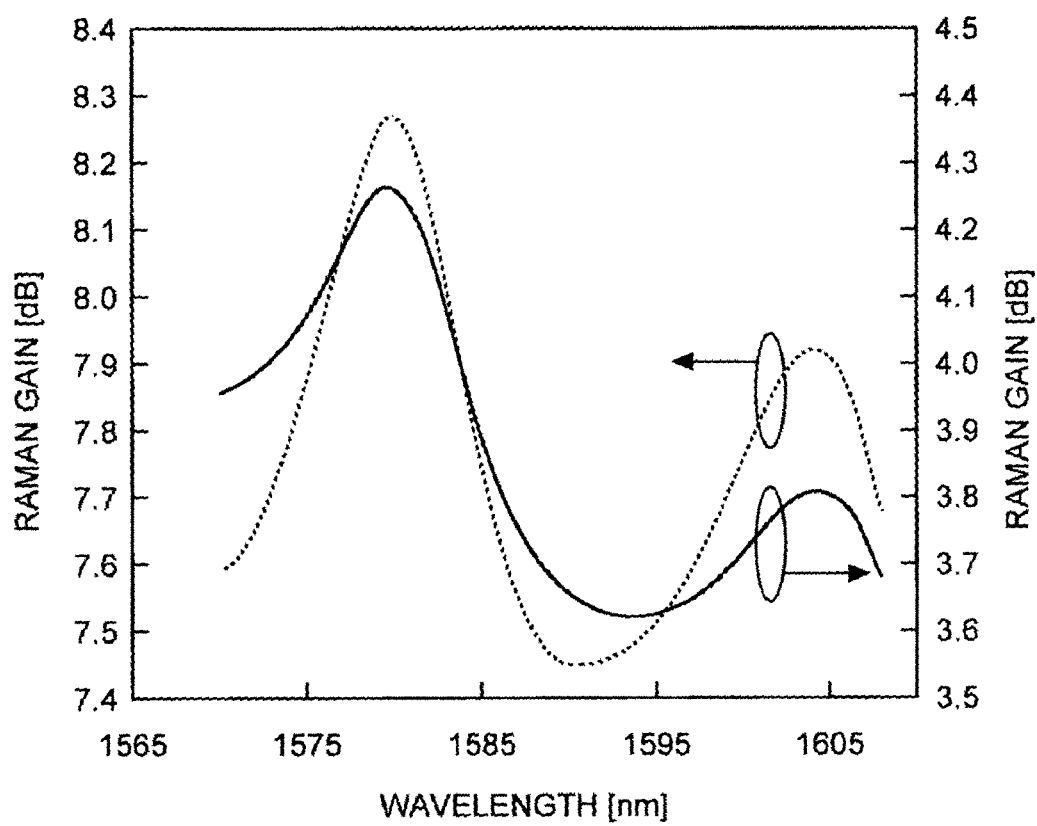
FIG. 5 is a graph illustrating an example of the wavelength-dependent Raman gain according to difference in the average gain.

According to the first embodiment, the signal light is first wavelength-multiplexed from a signal light of each wavelength and a reference light. The signal light level and the reference light level are detected by separating the wavelength-multiplexed signal light. The control target value of the output signal light is calculated from the detected signal light level and the reference light level. As the structure is such that the output of the excitation light source 8 is controlled based on the control target value, even when the gain efficiency of the transmission line optical fiber 1 varies or when the loss of the excitation light along the connection path of the transmission line optical fiber 1 varies, the desired Raman gain can be achieved by appropriately adjusting the output power of the excitation light source 8. Accordingly, unlike the conventional technology shown in FIG. 5, no change occurs in the wavelength characteristic of the gain and a signal light output with a constant wavelength characteristic can be achieved. Consequently, even when, the gain equalizer 10 is employed, as the signal light level of each wavelength does not change, the signal light can be corrected to a desired wavelength characteristic.

Even when the loss of the signal light along the path varies from time to time, the variation is detected as the reference light level Pref by the reference light level sensor 6b and is reflected in the control target value Ps_on of the output signal light level. Such a structure also helps maintain the desired Raman gain. For instance, when the optical fiber that is connected as the transmission line optical fiber 1 changes from a single mode fiber (SMF) to a dispersion-shifted fiber (DSF), the necessary power of the excitation light varies as the gain efficiency of the fiber varies considerably. However, the desired Raman gain, equal to the gain in the case of the SMF, can still be achieved by controlling the excitation light source 8 using the method described above.

Figure 3:
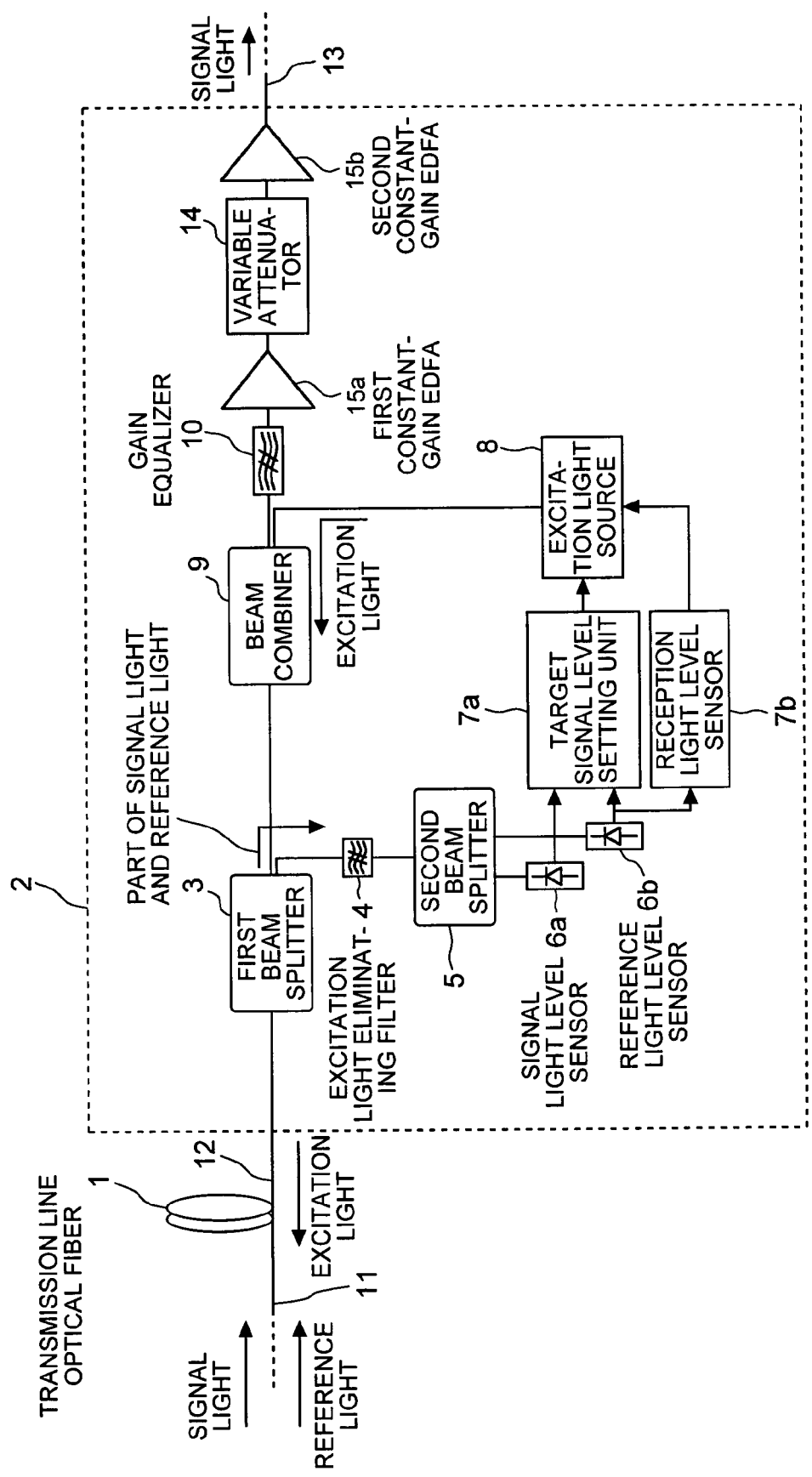
FIG. 3 is a block diagram of a Raman amplifier according to a second embodiment of the present invention.

FIG. 3 is a block diagram of a Raman amplifier according to a second embodiment of the present invention. In a Raman amplifier according to the second embodiment, a first constant gain Erbium-Doped Fiber Amplifier (EDFA) 15a is provided between the gain equalizer 10 and the variable attenuator 14. A second constant gain EDFA 15b is provided at the subsequent stage after the variable attenuator 14. In the following description, the parts that are identical or equivalent to those in FIG. 1 are assigned the same reference numerals and their explanation is omitted.

Figure 4:
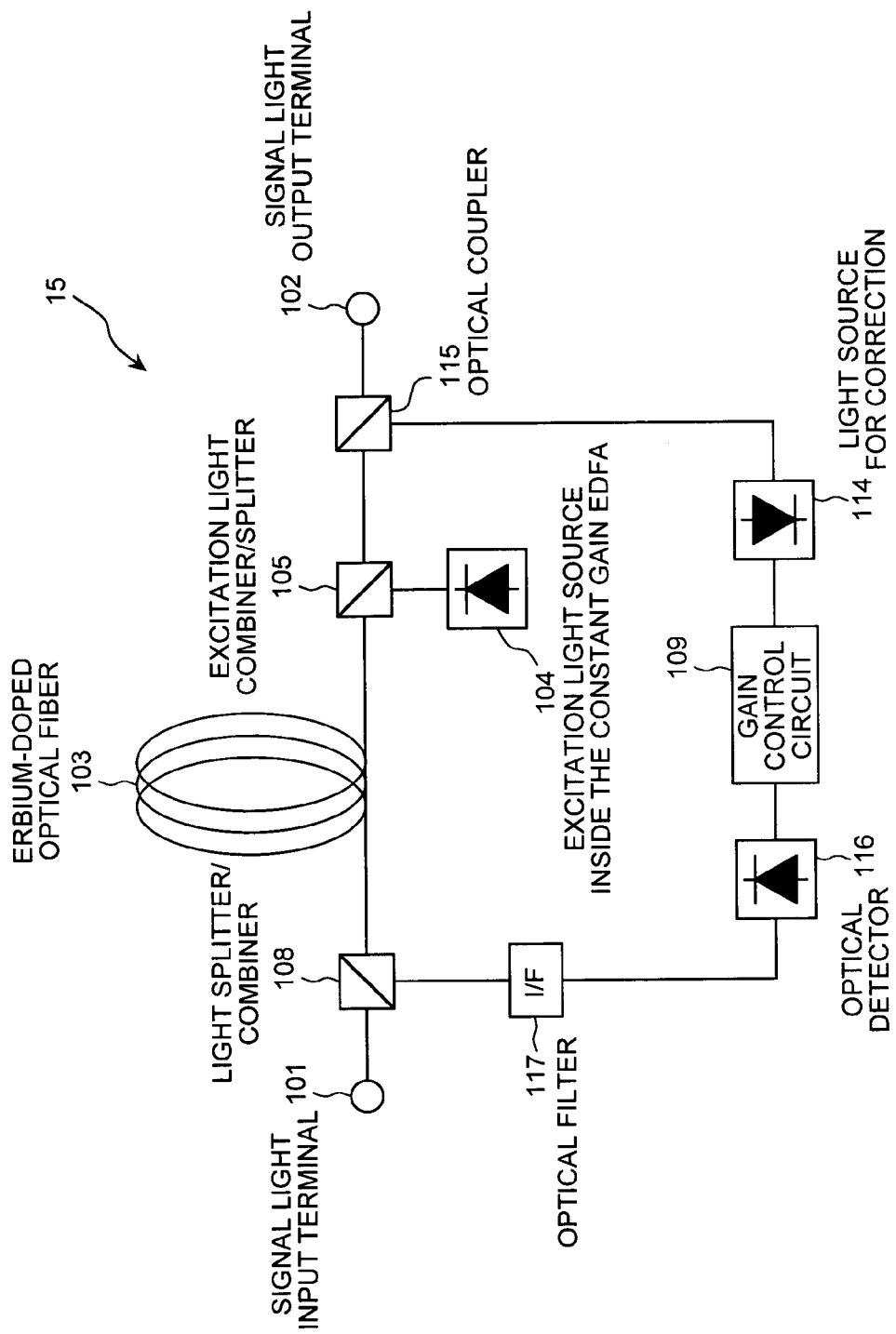
FIG. 4 is a block diagram of an example of the structure of an EDFA.

FIG. 4 is a block diagram of a constant gain EDFA of a correction light control system. A constant gain EDFA 15 includes a signal light input terminal 101 that inputs a main signal light, a signal light output terminal 102 that outputs the amplified main signal light, an erbium-doped optical fiber 103 that is an amplifying medium, an excitation light source 104 that excites the erbium-doped optical fiber 103, and an excitation light combining and beam splitter 105 that combines or separates an excitation light from the excitation light source 104 and a signal light. The constant gain EDFA 15 further includes a light splitting and coupling filter 108 that separates or couples the signal light of the signal light wavelength band input from the signal light input terminal, an optical filter 117 that transmits, from among the separated signal light, only the signal light of the required wavelength band, an optical detector 116 that detects lights in the signal light wavelength band, a gain control circuit 109 that controls the gain according to the power of the amplified spontaneous emission (ASE) that is detected by the optical detector 116, a light source for correction 114 that is in the range of the signal light wavelength band but varies from the signal light wavelength, and an optical coupler 115 that couples the light for correction and a probe light in the erbium-doped optical fiber 103.

The excitation light that is output from the excitation light source 104 enters the erbium-doped optical fiber 103 via the excitation light combining and beam splitter 105. The signal light input from the signal light input terminal 101 enters the erbium-doped optical fiber 103 via the light splitting and coupling filter 108 and is retrieved as an amplified signal light from the signal light output terminal 102 via the excitation light combining and beam splitter 105 and the optical coupler 115. As a change in the ASE light generated in the erbium-doped optical fiber 103 is detected and can be considered to be a change in the gain in the erbium-doped optical fiber 103, the optical detector 116 detects the ASE light power retrieved via the optical filter 117. In order to maintain the detected value constant, the correction light power, which is input into the erbium-doped optical fiber 103 via the optical coupler 115 and the excitation light combining and beam splitter 105, is controlled, thus stabilizing the gain.

In this way, the first constant gain EDFA 15a and the second constant gain EDFA 15b, wherein the excitation light emitted in the constant gain EDFA 15 is controlled such that the gain remains constant, also maintain the wavelength characteristic of the gain at a constant level, regardless of the level of input signal light. As a result, the entire wavelength-multiplexed signal light can be controlled within a desired level range by adjusting the signal light level in the variable attenuator 14.

In FIG. 3, the first constant gain EDFA 15a is provided at the input end of the variable attenuator 14 and the second constant gain EDFA 15b is provided at the output end of the variable attenuator 14. However, only either one of the constant gain EDFA 15a and the constant gain EDFA 15b can also be employed. The gain equalizer 10 can also be embedded in either the constant gain EDFA 15a or the constant gain EDFA 15b. When the gain equalizer 10 is included inside the constant gain EDFA 15, gain equalizer present in the constant gain EDFA 15 can be shared. Further, instead of using the constant gain EDFA 15 that employs the erbium-doped optical fiber as described above, any other rare-earth doped optical amplifier may also be employed. Also, a waveguide-type optical amplifier may be employed as the first constant gain EDFA 15a and the second constant gain EDFA 15b instead of an optical fiber amplifier.

The Raman amplifier 2 according to the second embodiment can be employed in the optical relay transmission system according to the first embodiment, shown in FIG. 2.

According to the second embodiment, in addition to the amplifier in the constant gain EDFA 15 that is conventionally employed as the optical relay transmission system, the optical relay transmission system further includes the Raman amplifier. Consequently, even when the gain efficiency of the transmission line optical fiber 1 varies or when the loss of the excitation light along the connection path of the transmission line optical fiber 1 varies, the desired Raman gain can be achieved by appropriately adjusting the output power of the excitation light source 8. Along with enhancing the transmission distance of the amplified signal light, the signal light can be further amplified while suppressing the loss and maintaining the gain at a constant level.

According to the first and second embodiments, the excitation light from the excitation light source 8 is propagated in the direction opposite to that of the signal light. However even when the excitation light is propagated in the same direction as that of the signal light, the Raman gain can be controlled at a constant level by monitoring only the signal that is output from the transmission line optical fiber 1. Although the optical fiber 1, which is the Raman-amplifying medium, is assumed to be the transmission line of the signal light, the Raman amplifier may also be implemented by providing the optical fiber inside an apparatus, similar to a lumped parameter type optical amplifier.

According to the present invention, a Raman amplifier with a constant gain is achieved by measuring the signal level only at the point of output. Moreover, an optical relay transmission system with a constant average gain and a constant wavelength characteristic is achieved regardless of the effect of the optical fiber or the level of the signal light, by applying the Raman amplifier to the optical relay transmission system. The entire wavelength-multiplexed signal light can be controlled within a desired level range by adjusting the level of the signal light, which is amplified by a constant gain using, for instance, a variable attenuator, etc.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A Raman amplifier, comprising:
   an optical fiber that propagates and amplifies a second signal light that is a wavelength-multiplexed signal of a first signal light and a reference light, wherein the first signal light includes a plurality of wavelengths and the reference light is out of a wavelength range of amplification;

an excitation light source that outputs an excitation light for amplifying the second signal light;

a beam splitter that splits a portion of the second signal light into the first signal light and the reference light;

a signal light level detecting unit that detects a level of the first signal light;

a reference light level detecting unit that detects a level of the reference light; and a signal level setting unit that, based on the level of the reference light, calculates a target value to control signal light level for constantly maintaining a Raman gain, and controls the output level of the excitation light in such a way that the first signal level matches with the target value.

2. The Raman amplifier according to claim 1, wherein the signal level setting unit controls the output level of the excitation light in such a way that the target value Ps_on is calculated as:

$$Ps\_on = Ps\_off \times G \times (Pref/Pref\_init)$$

where Ps_off is the level of the first signal light before being amplified Pref_init is the initial level of the reference light, Pref is the level of the reference light after the second signal light is amplified, and G is the Raman gain.

3. The Raman amplifier according to claim 1, wherein the reference light is a monitoring control light that is employed in an optical transmission system.

4. The Raman amplifier according to claim 1, further comprising:

a gain equalizer that corrects a wavelength-dependent gain profile of the amplified second signal light.

5. The Raman amplifier according to claim 1, further comprising:

a rare-earth-doped optical fiber amplifier that amplifies the Raman-amplified signal lights, by a specific gain; and a variable attenuator that attenuates a level of the signal light amplified by the rare-earth doped optical fiber amplifier to a desired value.

6. The Raman amplifier according to claim 1, further comprising:

a reception light level sensing unit that, when the reference light level falls below a specific value, forcibly lowers the output of the excitation light below a specific value before the target signal level setting unit controls the excitation light source.

7. An optical relay transmission system comprising:

a signal light transmitting unit that outputs a signal light that has a plurality of wavelengths, wavelength-multiplexes and transmits the signal light;

a reference light output unit that outputs a reference light of a wavelength that is out of a wavelength band of the signal light;

a Raman amplifier that amplifies, based on the reference beam, the wavelength-multiplexed signal light, wherein the Raman amplifier includes an optical fiber that propagates and amplifies a second signal light that is a wavelength-multiplexed signal of a first signal light and a reference light, wherein the first signal light includes a plurality of wavelengths and the reference light is out of a wavelength range of amplification;

an excitation light source that outputs an excitation light for amplifying the second signal light;

a beam splitter that splits a portion of the second signal light into the first signal light and the reference light;

a signal light level detecting unit that detects a level of the first signal light;

a reference light level detecting unit that detects a level of the reference light; and a signal level setting unit that, based on the level of the reference light, calculates a target value to control signal light level for constantly maintaining a Raman gain, and controls the output level of the excitation light in such a way that the first signal level matches with the target value; and a signal receiving unit that receives the signal light amplified by the Raman amplifier.

8. The optical relay transmission system according to claim 7, wherein a plurality of Raman amplifiers, including a first Raman amplifier and a last Raman amplifier, are cascaded in such a manner that the first Raman amplifier receives the wavelength-multiplexed signal light and the signal receiving unit receives the signal light amplified by the last Raman amplifier.

* * * * *